US005712547A

United States Patent [19]

Porter et al.

[11] Patent Number: 5,712,547

[45] Date of Patent: Jan. 27, 1998

[54] SOFTWARE CONTROLLED LATCHED VOLTAGE REGULATOR HAVING WIPER SWITCH DECODING

[75] Inventors: Eugene Bryan Porter, Beavercreek; Robert John Disser, Dayton, both of Ohio; Michael Bernard Monahan, Webster, N.Y.

[73] Assignee: ITT Automotive Electrical Systems Inc., Auburn Hills, Mich.

[21] Appl. No.: 455,301

[22] Filed: May 31, 1995

[51] Int. Cl.[6] .......... B60S 1/58

[52] U.S. Cl. .......... 318/282; 318/466; 318/DIG. 2; 307/10.1

[58] Field of Search .......... 318/443, 444, 318/280, 281, 282, 283, 284, 285, DIG. 2, 466, 468; 307/10.1; 15/250.001, 256.5; 160/11; 73/861.41; 322/282, 283, 284; 327/65, 170, 306, 334

[56] References Cited

U.S. PATENT DOCUMENTS

| | | | |
|---|---|---|---|
| 4,037,146 | 7/1977 | Kondo . | |
| 4,355,271 | 10/1982 | Noack . | |
| 4,685,023 | 8/1987 | Heaston . | |
| 4,916,374 | 4/1990 | Schierbeek et al. . | |
| 4,942,349 | 7/1990 | Millerd et al. . | |
| 5,057,754 | 10/1991 | Bell | 318/483 |
| 5,140,234 | 8/1992 | Wallrafen . | |
| 5,185,538 | 2/1993 | Kondoh et al. . | |
| 5,254,916 | 10/1993 | Hopkins . | |
| 5,298,851 | 3/1994 | DeNardis . | |
| 5,461,291 | 10/1995 | Boucheron | 318/443 |
| 5,493,190 | 2/1996 | Mueller | 318/443 |

FOREIGN PATENT DOCUMENTS

| | | |
|---|---|---|
| 0604290A1 | 12/1993 | European Pat. Off. . |
| 2685142A1 | 12/1992 | France . |
| 2284071 | 10/1994 | United Kingdom . |

*Primary Examiner*—John W. Cabeca

*Attorney, Agent, or Firm*—J. Gordon Lewis; Thomas N. Twomey

[57] ABSTRACT

A software-controlled latched voltage regulator includes three bipolar transistors responsive to a wiper switch multiplexed signal to place a latch formed by the transistors in an energized state, thereby supplying power to a microcontroller. One of the bipolar transistors is responsive to a deenergization signal supplied by the microcontroller, under software control, to place the latch in a deenergized state wherein regulated power is no longer supplied to the microcontroller. The voltage regulator further includes a zener diode that provides a reference voltage for use in connection with one of the transistors to implement a decoding function that is applied to the switch multiplexed signal to provide a pair of wiper switch position signals for use by the microcontroller during operation. While the latch remains in an energized state, the supplied regulated voltage enables the microcontroller to park a wiper arm of a wiper system, even though an ignition switch is an off position. Once the wiper arm is parked, as sensed by cam switches, the microcontroller deactivates the latch by generating the deenergization signal to power down the system in order to reduce current draw.

8 Claims, 3 Drawing Sheets

FIG 3

54

| | CAM SW2 PIN 19 G2 | CAM SW1 PIN 18 G1 |
|---|---|---|
| PARK | 0 | 0 |
| CW1W | 0 | 1 |
| CCW1W | 1 | 0 |
| NO IW | 1 | 1 |

56

| | PIN 9 L2 | PIN 8 L1 | PIN 7 L0 |
|---|---|---|---|
| OFF | d | 0 | 0 |
| PULSE | 0 | 1 | 1 |
| RUN | 0 | 0 | 1 |
| DRY WIPES | 1 | d | 1 |

FIG 4

SOFTWARE CONTROLLED LATCHED VOLTAGE REGULATOR HAVING WIPER SWITCH DECODING

BACKGROUND OF THE INVENTION

1. Field of the Invention

This invention relates generally to wiper control systems, and, more particularly, relates to a software deactivated latched voltage regulator for use in such systems and having a wiper switch decoding feature.

2. Background Art

The automotive industry has continuously strived to design products that meet or exceed the requirements of consumers. Consumers have indicated a desire for an opening/closing type rear window, at least with respect to certain models. However, before the present invention, such capability was unavailable for those models since the rear wiper systems used on those models left the wiper arm on the glass when the wiper system was turned off, or, when the ignition switch was turned off. These types of rear wiper systems are known as the non-depressed park type (i.e., the wiper arm does not automatically move to a "park," or, out-of-the-way position upon ignition off, or, wiper system off). Accordingly, to design for such a consumer request, a rear wiper system must have the capability to move the wiper arm off the glass to a depressed park position, even when the vehicle's ignition switch is in the "off" position.

Since such a wiper system as described above would contain an electronic processor to implement the various control operations, maintaining power to the wiper system, including the microprocessor, after switching off the ignition presents a design problem. To further define the contours of the above-mentioned powering problem, a further design limitation when using an electronic processor (or any power consuming device) dictates that the current draw from the vehicle's battery when the ignition switch is turned off must be kept to a minimum; otherwise, the battery will be drained. It should be immediately apparent from the foregoing that one solution to this powering problem-directly con/leering the microprocessor to the vehicle battery for operation when the ignition switch is off—is unacceptable, since such an arrangement would allow the microprocessor to continue to draw operating current even after the wiper arm parking operation has been completed. Such a drain on the vehicle battery is undesirable (for obvious reasons), and commercially unacceptable. Other requirements for such a wiper system include the capability of the microprocessor to park the wiper arm off of the rear window when a wiper function select switch is off, or, when the rear window is opened (in addition to when the ignition switch is off). A problem related to the proliferation of the above-mentioned signals is how to economically provide an interface for the various wiper switch positions (i.e., "off," "run," "pulse," "wash," etc.), the ignition switch position, etc., so that the microprocessor can obtain the information necessary for operation.

There is thus a need to provide a system to maintain power to a wiper control system's microprocessor, even after the ignition switch is moved to the off position, so that the microprocessor can park the wiper arm, and then place itself in a low current mode, such that one more of the problems as stated above may be reduced or eliminated.

SUMMARY OF THE INVENTION

This invention provides the means for delivering depressed park-type rear wiper systems on vehicles, in accordance with consumer demand, in an economical and reliable fashion by providing a software controlled latched voltage regulator having an integrated wiper switch decoding feature. A device in accordance with the present invention includes three major elements: regulator means, decoder means, and latch means. The regulator means is responsive to a DC power source for generating a regulated voltage at an output node and includes means for generating a reference signal. Such regulated voltage is used to power the wiper system, including a microprocessor. The decoder means is responsive to a switch multiplexed signal and the reference signal (used for comparison purposes) for generating a plurality switch position signals. The switch position signals, collectively, correspond to a position of a control switch (i.e., a wiper function select switch in a preferred embodiment). Finally, the latch means is provided for enabling the regulator means to generate the regulated voltage when in an energized state, and, for discontinuing generation of the regulated voltage when in a deenergized state.

The latch means transitions from the deenergized state (for example, the powered-up state) to the energized state when the switch multiplexed signal changes from an inactive state to an active state. In the preferred embodiment, the inactive state is characterized by either an off vehicle ignition switch, the wiper function-select switch being placed in an off position, or, when a rear window of a vehicle employing this invention is opened (i.e., glass ajar). In the preferred embodiment, a RUN position, PULSE position, or a WASH position of the wiper switch represent active states (provided the ignition switch is on and the rear window is closed). Once the latch means is in the energized state, it will stay there, notwithstanding a change of the switch multiplex signal to an inactive state.

Finally, the latch means is responsive to a deenergization signal (generated by a microprocessor under software control in the preferred embodiment) for transitioning from the energized state to the deenergized state to thereby cause the regulator means to discontinue generation of regulated voltage. In one embodiment, the microprocessor generates the deenergization signal after it parks the wiper arm.

These and other features and objects of this invention will become apparent to one skilled in the art from the following detailed description and the accompanying drawings illustrating features of this invention by way of example.

DESCRIPTION OF THE DRAWINGS

FIG. 3 is a table showing the relationship between wiper position signals, and an actual wiper arm position.

FIG. 4 is a table showing the relationship between an actual position of a wiper function select switch, and switch position signals provided to a microprocessor portion of the wiper controller of FIG. 2.

DETAIL DESCRIPTION OF THE PREFERRED EMBODIMENTS

Figure 1:
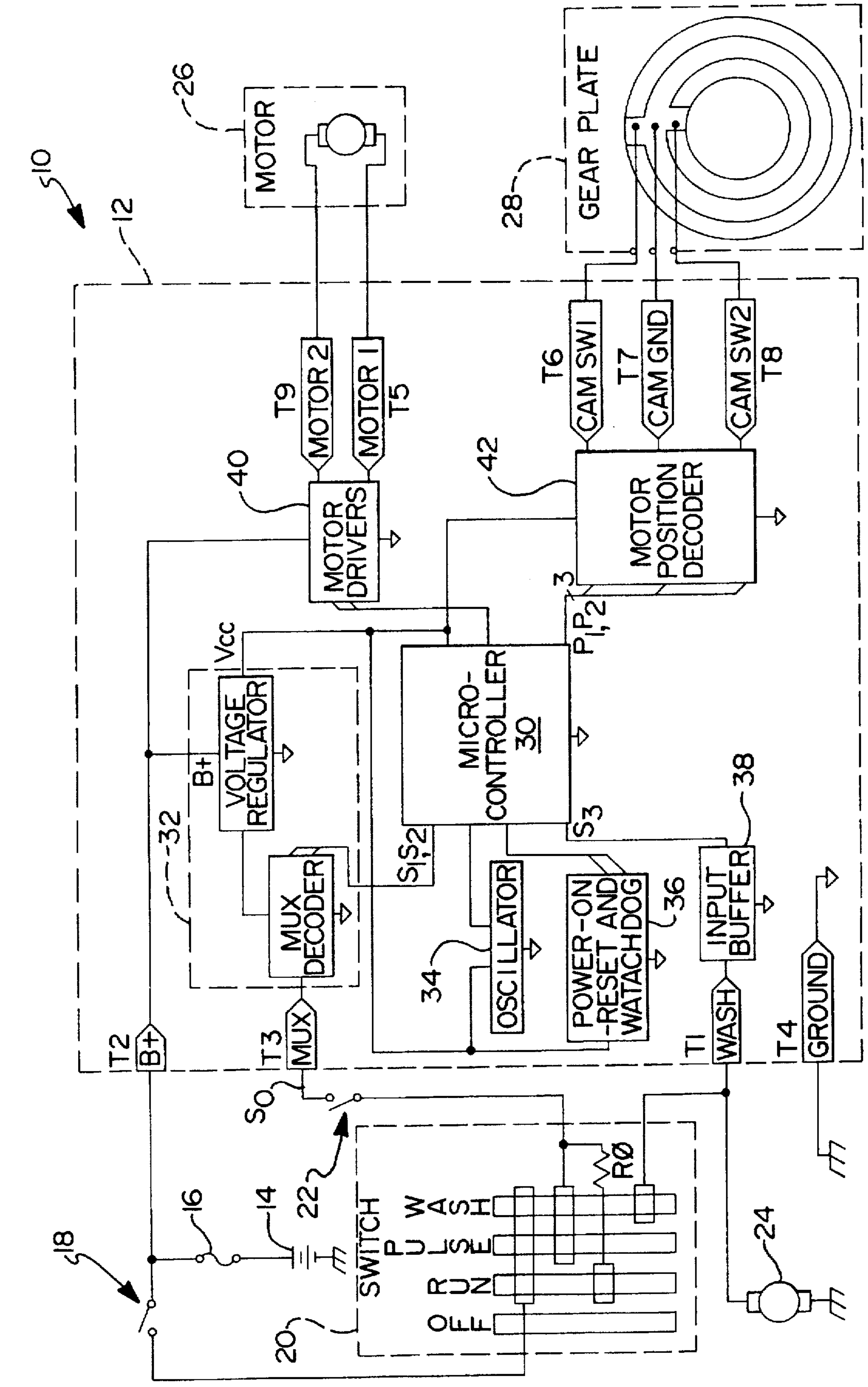
FIG. 1 is a simplified block diagram view of a depressed park rear wiper system embodiment of the present invention.

Referring now to the drawings wherein like reference numerals are used to identify identical components in the various views, FIG. 1 shows a depressed park type rear wiper system 10 in accordance with the present invention, including a wiper controller 12, a vehicle battery 14, an in-line fuse 16, an ignition switch 18 having open and closed positions, means, such as a wiper function select switch 20, responsive to user actuation for selecting one of a plurality of wiper functions and for generating in response thereto a switch multiplexed (mux) signal corresponding to the selected wiper function, a glass ajar switch 22 having open and closed positions, a wash pump 24, a motor 26 for moving a wiper arm (not illustrated) through a plurality of positions on a rear window of a vehicle, and, means, such as a gear plate/cam switch 28, for detecting a position of the wiper arm.

Wiper controller 12 controls motor 26 to move the wiper arm according to detected wiper positions (via gear plate/cam switch 28) and further according to a predetermined control strategy. Vehicle battery 14 is standard and may nominally provide 12 volts DC (designated B+). Ignition switch 18 is conventional; it provides "switched" power such that, when in an OFF position (open switch), devices connected downstream will be without power. This characteristic is used to reduce power consumption/battery drain by connecting power consuming devices to the ignition.

Switch 20 includes four positions corresponding to four wiper functions: (1) an OFF position; (2) a RUN position; (3) a PULSE or PLS position; and, (4) a WASH position. Switch 20 is provided for passing vehicle battery voltage B+ to controller 12. When ignition switch 18 is an OFF (opened) position, or when glass ajar switch 22 is in an open position, the actual user-selected position of switch 20 is undetectable to controller 12, since no vehicle battery voltage will be applied to controller 12. However, assuming ignition switch 18 is in the ON (closed) position, and switch 22 is in the closed position, the OFF position of switch 20 will result in no battery voltage being applied to controller 12. When the RUN position is selected, the switch mux input node of controller 12 is connected to B+ through resistor R0, preferably 1 k ohm. Alternatively, when the PULSE, or WASH position is selected, the switch mux input of controller 12 is directly connected to vehicle battery voltage (B+). Since the different positions of switch 20 result in differing types of connections to the switch mux input node, the resulting signal may be referred to as a switch multiplexed signal $S_O$, or simply a select signal $S_O$. The signal $S_O$ corresponds to the selected position of switch 20, and thus also to the selected wiper function, whose full import will elaborated upon below.

Wash pump 24 is included to provide its conventional function in wiper system 10 (i.e., pump wash fluid onto the vehicle rear window).

Motor 26 is provided for moving the wiper arm, as discussed above, and is conventional.

Gear plate/cam switches 28, in the preferred embodiment, is provided with two cam switches for detecting four discrete positions of the wiper arm: a PARK position, a CWIW position (clockwise inside-wipe), a CCWIW position (counter-clockwise inside-wipe), and a NO IW position (inside-wipe). The PARK position is an out-of-the-way position permitting opening/closing of the vehicle rear window. The CWIW, and CCWIW positions correspond to the respective limits of motion of the windshield wiper arm. The NO IW position relates to the position of the wiper arm intermediate the CWIW, and CCWIW positions. The means for implementing this detecting scheme (i.e., cam switches) is conventional and well within the capability of one of ordinary skill in the art. Moreover, it should be understood that other detection schemes (e.g., continuous position detection) remain within the spirit and scope of the present invention.

Wiper controller 12 includes microcontroller 30, latched voltage regulator and decoder circuit 32, oscillator 34, power-on-reset and watchdog circuit 36, input buffer 38, motor drivers 40, and motor position decoder circuit 42.

With continued reference to FIG. 1, microcontroller 30 forms a control means responsive to wiper position signals $P_1$, and $P_2$, for controlling motor 26 to move the wiper in accordance with wiper switch position signals $S_1$, $S_2$, and $S_3$, which are indicative of the selected wiper function. Microcontroller 30 uses motor drivers 40 to accomplish this movement. In the preferred embodiment, microcontroller 30 takes the form of a device model COP822C, which is commercially available from National Semiconductor. It should be appreciated, however, that there are a wide range of equivalent microcontrollers/microprocessors suitable for constructing devices within the spirit and scope of the present invention.

Latched voltage regulator and decoder circuit 32 includes circuitry or means for providing at least three important functions. First, circuit 32 includes regulator means responsive to a direct current (DC) power source, such as B+, for generating a regulated voltage, such as $V_{cc}$. Second, circuit 32 further includes latch means for enabling generation of $V_{cc}$ when the latch means (as explained in detail below) is in an energized state, and for discontinuing generation of $V_{cc}$ by the regulator means when the latch means is in a deenergized state. Finally, circuit 32 includes decoder means responsive to signal $S_0$ for generating wiper switch position signals $S_1$ and $S_2$. Signals $S_1$ and $S_2$ are indicative of the selected position of switch 20 and, in combination with signal $S_3$ (FIG. 1), fully define what wiper function has been selected by switch 20.

Oscillator 34, which is conventional, is provided to set the operation rate of microcontroller 30.

Power-on-reset and watchdog circuit 36 is provided for maintaining microcontroller 30 in a RESET condition during power-up, and, for providing a conventional "watchdog" function. That is, microcontroller 30 is programmed to provide periodic output pulses on an output terminal that occur only when microcontroller 30 is operating normally. If circuit 36 does not timely receive these pulses, (an indication of abnormal operation) it will hold microcontroller 30 in RESET; otherwise, receipt of such pulses prevents circuit 36 from resetting controller 30 (i.e., which would result in a shut-down of the system).

Input buffer 38 provides a conditioning or buffering function for switch 20 and pump 24, to indicate when a WASH function of system 10 has been selected. Buffer 38 outputs signal $S_3$, which, in combination with signal $S_1$ and $S_2$, fully define the selected position of switch 20.

Figure 2:
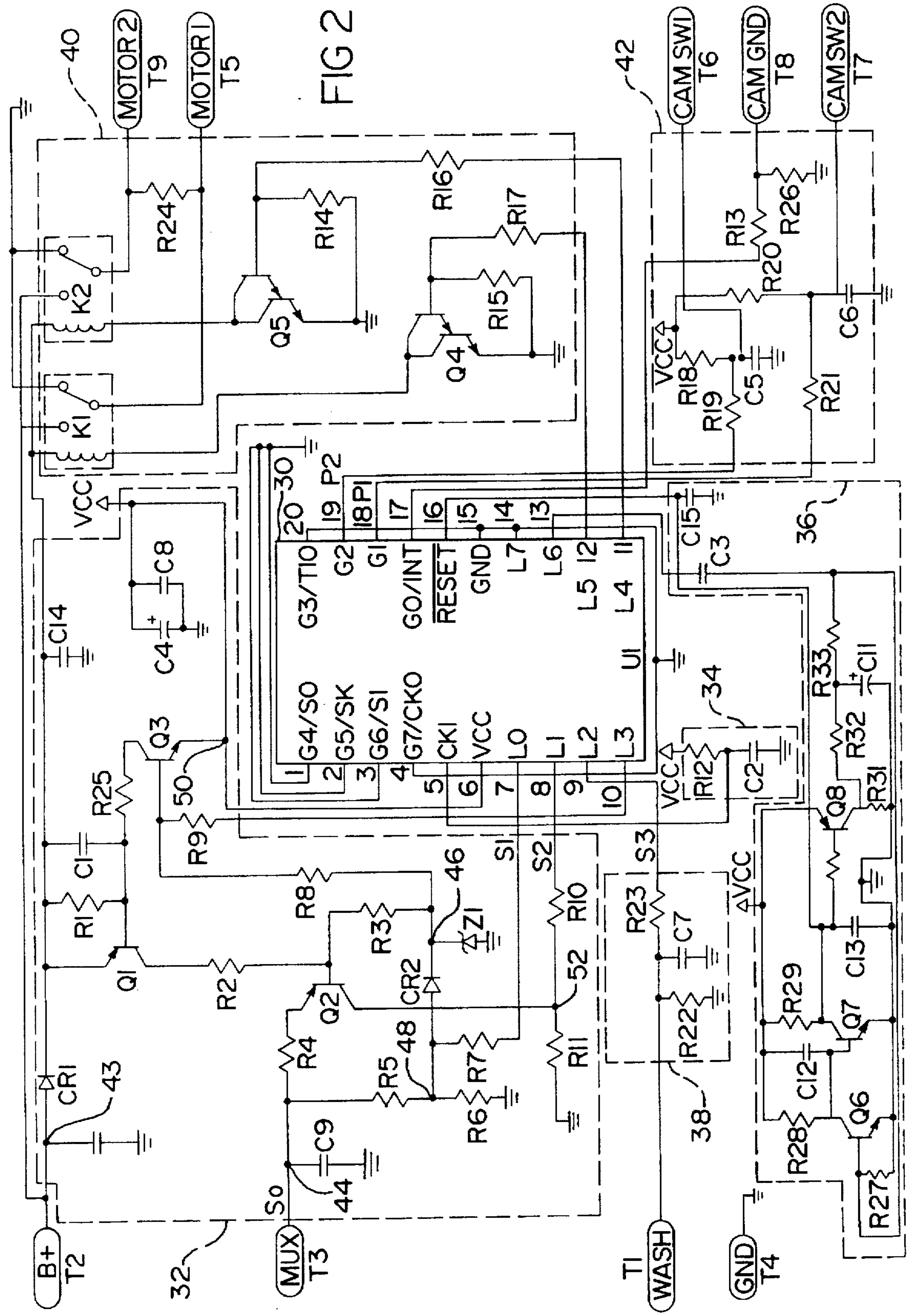
FIG. 2 is a schematic diagram view of a wiper controller of the system shown in FIG. 1, illustrating particularly a software-controlled latched voltage regulator embodiment of the present invention.

Motor drivers 40 are included for providing an interface between microcontroller 30, and motor 26 and are shown in detail in FIG. 2.

Motor position decoder circuit 42 is included for providing an interface between gear plate/cam switches 28, and microcontroller 30. In the preferred embodiment, circuit 42 is responsive to an opened/closed position of a first cam switch (CAMSW1), and an opened/closed position of a second cam switch (CAMSW2) for generating wiper position signals $P_1$, $P_2$ that are indicative of the four wiper positions (by way of a motor position): PARK, CWIW, CCWIW, and NO IW. In combination, gear plate/cam switches 28, and decoder circuit 42 form the means for detecting a position of the wiper arm and for generating the wiper position signals $P_1$, and $P_2$ in response thereto.

Referring now to FIG. 2, wiper controller 12 is shown in greater detail. In the following component level description, pertinent commercially available part numbers and/or component values found satisfactory in the constructed embodiment have been set forth in parentheses after the indicated component. It should be understood that these designations are for purposes of description, and not limitation.

Circuit 32 includes switch mux node 44, reference signal node 46, first switch-position node 48, output node ($V_{cc}$) 50, and a second switch-position node 52. Circuit 32 provides the DC regulated voltage supply $V_{cc}$ for wiper controller 12, including microcontroller 30. Node 43, which is connected to vehicle battery 14 that supplies B+, has connected thereto to a ground node a capacitor C10 (0.001 micro pF), and is further connected through a forward biased diode CR1 (1N4004) to an emitter terminal of a PNP bipolar transistor Q1 (PN201) having a base terminal connected, by way of a resistor R1 (330 Ω) and a capacitor C1 (0.01 μF) in parallel, to the emitter terminal of Q1. Circuit 32 further includes a PEP bipolar transistor Q2 (PN201) having a base terminal connected through a resistor R2 (330 Ω) to a collector terminal of Q1. An emitter terminal of Q2 is connected through a resistor R4 (10K Ω) to node 44, the switch mux node. A collector terminal of Q2 is connected through a resistor R11 (100K Ω) to ground. A zener diode (1N5232 5.6V) includes an anode connected to ground and a cathode connected through a resistor R3 (470 Ω) to the base terminal of Q2.

Capacitor C9 (0.001 μF) is connected between node 44 and ground.

Resistor R5 (1K Ω) and resistor R6 (1.5K Ω) are connected in series between node 44 and ground.

A diode CR2 (1N4004) is connected between nodes 46 and 48.

Circuit 32 further includes EPN bipolar transistor Q3 (PN101) having a base terminal connected through a resistor R8 (4.7K Ω) to node 46, a collector terminal connected through a resistor R25 (470 Ω) to the base of Q1, and an emitter terminal connected to output node 50 ($V_{cc}$).

Capacitor C4 (220 μF), and capacitor C8 (0.1 μF) are connected in parallel between node 50 and ground.

First switch-position node 48 is connected to pin 7 of microcontroller 30 through a resistor R7 (100K Ω). Second switch-position node 52 is connected to pin 8 of microcontroller 30 through a resistor R10 (100K Ω). The base terminal of Q3 is connected to pin 10 of microcontroller 30 through a resistor R9 (4.7K Ω).

Operation of wiper controller 12, and circuit 32 in particular, occurs as follows. Assume that ignition switch 18, and glass ajar switch 22 are closed, and that switch 20 is in the OFF position. Microcontroller 30 configures pin 10, initially, to be high-impedance (tri-state mode). The latch means of circuit 32 is in a deenergized state upon power-up. Accordingly, microcontroller 30, as well as other components of wiper controller 12, are not provided with power.

When switch 12 is moved from the OFF position to one of either the RUN, PULSE, or WASH positions, node 44 changes to a relatively high voltage level: B+ minus the voltage drop across resistor R0 (for the PULSE position), or the voltage level of B+ (for the RUN, and WASH positions). The voltage at node 44 turns on transistor Q2. When Q2 turns on, zener diode Z1 clamps the voltage at node 46 to 5.6 volts, which, when applied to the base of Q3, turns on transistor Q3.

When transistor Q3 turns on, a current spike is generated through the collector-emitter Junction of Q3, R25, R1, and the emitter-base Junction of transistor Q1 to charge capacitor C4. The current through the emitter-base junction of Q1 causes Q1 to turn on. With Q1 in saturation, the latch means is energized wherein Q3 is used in an emitter-follower configuration to supply a regulated $V_{cc}$ of approximately 5.0 volts on node 50 to power microcontroller 30 ($V_{cc}$ line=pin 6 of controller 30).

Thus, the regulator means of circuit 32 includes transistor Q1, zener diode Z1, and transistor Q3. Further, such regulator means also includes means for generating a reference signal, which takes the form of the clamped 5.6 volt signal at the cathode of zener diode Z1, the reference node 46.

Referring to FIGS. 2 and 3, microcontroller then carries out the selected function, as determined by wiper switch 20, by controlling motor 26. Feedback information (signals $P_1$ and $P_2$) is obtained by gear plate/cam switches 28 and decoder 42 and is used by microcontroller 30. Microcontroller 30 determines the position of the wiper arm in accordance with Table 54 of FIG. 3.

The above-referenced determination of the wiper switch 20 position occurs in the following manner. The voltage appearing at node 48 (i.e., the division of the voltage at node 44 through resistors R5 and R6), is provided to microcontroller 30 as signal $S_1$ on line 7.

In an initial PULSE position of switch 20, the voltage divider effect of R0, R5 and R6 cause a lower-than-B+ voltage at node 44. With Q1 in saturation (as described above), Q2 is reversed biased and is thus turned off. Since the collector of Q2 floats, node 52 is pulled to ground through resistor R11 and is provided to microcontroller 30 as signal $S_2$ (low) on line 8.

In an initial RUN or WASH position, (or when switch 20 is moved from the PULSE to the RUN position or WASH position), B+ is provided at node 44, thereby forward biasing the emitter-base Junction of Q2 to turn Q2 on. Accordingly, the collector of Q2 is high, and node 52 is pulled-up to a logic high state, which is provided to pin 8 (signal $S_2$) of microcontroller 30. Thus having signals $S_1$, $S_2$, and $S_3$ available, microcontroller 30 determines the position of wiper switch 20 in accordance with Table 56 of FIG. 4. The entries designated by a "d" are "don't care" entries.

From the foregoing, it should thus be appreciated that the reference signal appearing at reference node 46 (due to Z1), performs two functions: the first function is to provide a regulated voltage reference for Q3 to generate $V_{cc}$; and, the second function is to provide a reference voltage that is applied to the base of Q2, which operates as a comparator whose output (i.e., the collector of Q2) is provided to line 8 of microcontroller 30. That is, the reference voltage aids in decoding the switch mux signal $S_0$ provided by switch 20.

The decoder means of circuit 32 is thus responsive to signal $S_0$ and to the reference voltage at node 46 for generating switch position signals $S_1$ and $S_2$, and includes Q2, Z1, R11, and R5 and R6.

When the ignition switch 18 is moved to an OFF position (opened), or switch 20 is set to the OFF position, or the glass ajar switch is opened, the voltage at node 44 is pulled to ground through resistors R5, and R6. The latch means of circuit 32 remains energized (i.e., in an energized state), however, thus providing regulated voltage at node 50 so that microcontroller 30 can control motor 26 by way of motor driver 40 to park the wiper arm, as detected by gear plate/cam switches 28, and decoder circuit 42.

After the wiper arm has been parked, microcontroller 30 configures line 10 as an output low (to sink current). This low output constitutes a latch deenergization signal. It should be appreciated that this control strategy (parking the wiper arm) may include other tasks prior to initiation of the deenergization signal (e.g., a predetermined time interval, etc.). This action reduces the voltage applied to the base of transistor Q3 by approximately one-half. Since the voltage upon capacitor C4 is close to $V_{cc}$ (at the point in term when line 10 goes low), the base-emitter junction of Q3 becomes reversed biased wherein Q3 is turned off. Since there is no current flowing through Q3 from the emitter-base junction of transistor Q1, Q1 also turns off. Because no voltage is being regulated by Z1, transistor Q3 is kept off. Accordingly, the latch is deenergized or powered down. In practice, the microcomputer remains powered up while the latch powers down due to the charge on capacitor C4. The charge upon C4 discharges to ground through the cam switches, wherein $V_{cc}$ falls to substantially ground potential. Microcontroller 30 is thus in a low-current draw mode. Capacitor C4 is selected so that its discharge time is longer than the deenergization time constant of the latch means. The 220 μF value used in the preferred embodiment for C4 has been found to be satisfactory in this respect.

Thus, the latch means of circuit 32 is provided for enabling the regulator means to generate the regulated voltage on node 50 when the latch is an energized state, and for discontinuing generation of the regulated voltage when the latch is in a deenergized state. The latch means includes, transistors Q1, Q2, and Q3.

A significant advantage of circuit 32 is that it is highly integrated; that is, the latch means is integrated with the voltage regulator, which is further integrated with the wiper switch decoding logic (i.e., some components perform dual functions, such as component Z1). This high level of integration results in a low part count, which is an important figure of merit when mass production is considered, both in terms of material costs, and also in terms of reliability. Moreover, another feature of the present invention relates to the software control of the latch turn-off.

The preceding description is exemplary rather than limiting in nature. A preferred embodiment of this invention has been disclosed to enable one skilled in the art to practice this invention. Variations and modifications are possible without departing from the purview and spirit of this invention (for example, this invention may be applied to front wiper systems). The scope of the invention is limited only by the appended claims.

We claim:

1. A motor-operated wiper control system, comprising:

switch means responsive to user actuation for selecting one of a plurality of wiper functions and for generating in response thereto a switch multiplexed signal corresponding to the selected wiper function;

wiper position detecting means for detecting a position of the wiper and generating a position signal indicative of the detected position;

a power latch and decoder circuit having an output node and including regulator means responsive to a direct current (DC) power source for generating a regulated voltage at said output node, said regulator means including means for generating a reference signal, said circuit further including decoder means responsive to said switch multiplexed signal and said reference signal for generating a wiper function signal indicative of the selected wiper function, said circuit further including latch means for enabling said regulator means to generate said regulated voltage when in an energized state and for discontinuing generation of said regulated voltage when in a deenergized state;

control means responsive to said position signal for controlling the motor to move the wiper in accordance with said wiper function signal, said control means being coupled to said output node for obtaining operating power therefrom.

2. The system of claim 1 wherein said latch means transitions from said deenergized state to said energized state when said switch signal changes from an inactive state to an active state, said latch means being operative for maintaining said energized state when said switch signal changes from said active state to said inactive state, said control means including means for generating a deenergizatton signal according to a predetermined control strategy, said latch means being responsive to said deenergization signal for transitioning from said energized state to said deenergized state in response thereto wherein generation of said regulated voltage is discontinued to thereby power down said control means.

3. The system of claim 2 wherein said predetermined control strategy includes parking the wiper.

4. The system of claim 2 wherein said inactive state of said switch multiplexed signal is indicative of one of a vehicle ignition off condition and an off wiper function select condition.

5. The system of claim 2 wherein said active state of said switch signal is indicative of one of a pulse wiper function condition, a run wiper function condition, and a wash wiper function condition.

6. The wiper control system of claim 5 wherein said means for generating a reference signal includes a zener diode.

7. The wiper control system of claim 5 wherein said wiper function signal comprises a plurality of switch position signals, and wherein said decoder means includes a transistor having a collector whose voltage defines a first one of said plurality of switch position signals, a base for receiving said reference signal through a first resistor, and an emitter for receiving said switch multiplexed signal through a second resistor; and, a voltage divider network for receiving said switch multiplexed signal and having an output node whose voltage defines a second one of said plurality of switch position signals.

8. The wiper control system of claim 5 wherein said switch multiplexed signal has an active state and an inactive state, and said latch means transitioning from said deenergized state to said energized state when said switch multiplexed signal transitions from said inactive state to said active state, said latch means being further operative for maintaining said energized state when said switch multiplexed signal transitions from said active state to said inactive state wherein generation of said regulated voltage is maintained by said regulator means, said latch means being responsive to a deenergization signal for transitioning from said energized state to said deenergized state wherein generation of said regulated voltage is discontinued by said regulator means.

* * * * *